(12) United States Patent
Dvorkovich et al.

(10) Patent No.: US 11,989,528 B2
(45) Date of Patent: May 21, 2024

(54) METHOD AND SERVER FOR TRAINING A MACHINE LEARNING ALGORITHM FOR EXECUTING TRANSLATION

(71) Applicant: YANDEX EUROPE AG, Lucerne (CH)

(72) Inventors: Anton Aleksandrovich Dvorkovich, Moscow (RU); Ivan Sergeevich Komarov, Yekaterinburg (RU)

(73) Assignee: Direct Cursus Technology L.L.C, Dubai (AE)

( * ) Notice: Subject to any disclaimer, the term of this patent is extended or adjusted under 35 U.S.C. 154(b) by 225 days.

(21) Appl. No.: 17/553,788

(22) Filed: Dec. 16, 2021

(65) Prior Publication Data

US 2022/0207244 A1    Jun. 30, 2022

(30) Foreign Application Priority Data

Dec. 30, 2020 (RU) .......................... RU2020143957

(51) Int. Cl.
    *G06F 17/00*      (2019.01)
    *G06F 40/284*    (2020.01)
    *G06F 40/47*     (2020.01)
    *G06N 3/04*      (2023.01)

(52) U.S. Cl.
    CPC ............ *G06F 40/47* (2020.01); *G06F 40/284* (2020.01); *G06N 3/04* (2013.01)

(58) Field of Classification Search
None
See application file for complete search history.

(56) References Cited

U.S. PATENT DOCUMENTS

| | | | |
|---|---|---|---|
| 10,810,373 B1 | 10/2020 | Pappu et al. | |
| 10,867,136 B2 * | 12/2020 | Lee | .......................... G10L 25/30 |
| 2019/0138606 A1 | 5/2019 | Tu et al. | |
| 2019/0287012 A1 * | 9/2019 | Celikyilmaz | ......... G06F 16/345 |

(Continued)

FOREIGN PATENT DOCUMENTS

| | | |
|---|---|---|
| CN | 108874765 A | 11/2018 |
| CN | 111062206 A | 4/2020 |

(Continued)

OTHER PUBLICATIONS

Russian Search Report dated Sep. 26, 2022 issued in respect of the counterpart Russian Patent Application No. RU 2020143957.

*Primary Examiner* — Satwant K Singh
(74) *Attorney, Agent, or Firm* — BCF LLP

(57) ABSTRACT

Methods and electronic devices for executing offline translation of a source word into a target word via a Neural Network an encoder and a decoder. The method includes splitting the source word into input tokens, generating vector representations for input tokens, and generating a first sequence of output tokens representative of a first candidate word. In response to the first candidate word not respecting at least one pre-determined rule, the method includes triggering the decoder to generate a second sequence of output tokens having a different at least one last output token than at least one last output token of the first sequence. The second sequence is representative of a second candidate word. In response to the second candidate word respecting the at least one pre-determined rule, the method includes determining that the second candidate word is the target word.

20 Claims, 4 Drawing Sheets

(56) References Cited

U.S. PATENT DOCUMENTS

| | | | |
|---|---|---|---|
| 2020/0034435 A1* | 1/2020 | Norouzi | G06N 3/084 |
| 2020/0034436 A1 | 1/2020 | Chen et al. | |
| 2021/0019478 A1* | 1/2021 | Matsuoka | G06F 40/51 |
| 2021/0303606 A1* | 9/2021 | Tan | G06F 16/3334 |
| 2021/0390271 A1* | 12/2021 | Norouzi | G06N 3/044 |

FOREIGN PATENT DOCUMENTS

| | | | | |
|---|---|---|---|---|
| EP | 3267328 A1 * | 1/2018 | | G06F 17/2785 |
| RU | 2692049 C1 | 6/2019 | | |
| WO | 2018213530 A2 | 11/2018 | | |

* cited by examiner

METHOD AND SERVER FOR TRAINING A MACHINE LEARNING ALGORITHM FOR EXECUTING TRANSLATION

CROSS-REFERENCE

The present application claims priority to Russian Patent Application No. 2020143957, entitled "Method and Server for Training a Machine Learning Algorithm for Executing Translation", filed Dec. 30, 2020, the entirety of which is incorporated herein by reference.

FIELD

The present technology relates to machine learning in general and, specifically, to a method and server for training a machine learning algorithm for translation.

BACKGROUND

With the growth of users accessing the Internet, a vast amount of Internet based services has surfaced. Such services include, for example, search engine services (such as Yandex™ and Google™ search engines, for example) that allow users to retrieve information by submitting queries to a search engine. Also, social network services as well as multimedia services enable a large variety of users with different social and cultural backgrounds to engage on unified platforms for exchanging content and information. Digital content and other information being exchanged amongst users may be in a variety of languages. For that reason, due to the ever-increasing amount of information being exchanged on the Internet, translation services such as Yandex.Translate™, for example, are often used.

The latter service has been particularly useful in allowing users to easily translate a text (or even a speech) from one language, which the user does not understand, into another one, which she does. This means that translation services are generally designed to provide a translated version of content in a language that the user understands to make that content intelligible for the user.

Translation engines are typically trained based on a large number of examples of parallel sentences between a source language and a target language. However, conventional computer systems providing translation services still have many drawbacks, such as offline translation services where a translation model is executed locally on a user's device.

Patent application CN111062206 entitled "Method and device for splitting sub-word unit and computer readable storage medium", published on Apr. 24, 2020, discloses based on a machine translation thereof, a method and a device for splitting a sub-word unit and a computer readable storage medium. According to the method for splitting the sub-word unit provided by the embodiment of the invention, on the basis of the input sentence after word segmentation, the feature mapping of the input sentence is obtained by using convolution filters with different lengths of a convolution neural network. The combination of feature mapping fragments is further carried out among a plurality of obtained feature mappings so as to obtain the mapping fragment combination corresponding to the input sentence, and then the optimal word segmentation is selected from the mapping fragment combinations according to the obvious degree of the features.

SUMMARY

Developers of the present technology have appreciated certain technical drawbacks associated with the existing translation services. It is an object of the present technology to ameliorate at least some of the inconveniences present in the prior art. Developers of the present technology have devised methods and systems for ameliorating the quality of offline translation services.

Translation services may be performed in an offline mode for a variety of reasons. In one example, a translation model may be executed locally on a user's device for allowing the user to translate text even if the user device is not in communication with a remote server executing a translation engine. Although local translation models allow offline translation, their translation quality may suffer.

It should be noted that translation models executed locally generally have a lower capacity factor than translation models executed remotely. Broadly speaking, a capacity of a machine learned model refers to a range or scope of the types of functions that the model can approximate. As such, due to the availability of inter alia more computational resources remotely, translation models executed remotely provide better translations than translation models executed locally. For example, a translation model executed locally may have less parameters or may learn less rules than a translation model executed remotely.

In some cases, locally executed translation models are prone to generating "neologisms". Broadly speaking, neologisms are words that do not exist and/or that have been used only recently and/or have not yet entered common use or mainstream language. Developers of the present technology have realized that locally executed translation models are more prone to generating neologisms than remotely executed translation models due to their comparatively lower capacity factors. In at least some embodiments of the present technology, there are provided methods and systems that allow increasing the quality of translation services of locally executed translation models by reducing a number of neologisms generated thereby during offline translation.

In some embodiments of the present technology, a local translation model is built by training a Neural Network (NN), the NN comprising an encoder portion associated with a source language and a decoder portion associated with a target language. Broadly speaking, the encoder portion receives a sequence of input tokens generated based on text in the source language and produces a compact representation of that input sequence, trying to summarize or condense all of its information. These compact representations are received by the decoder portion in its initial state, and which can also receive other external inputs. At each step, the decoder portion generates an element of its output sequence (an output token) based on the inputs received and its current state, as well as updating its own state for the next step where an other element of the output sequence is generated (a next output token).

In the context of the present technology, the decoder portion is implemented with an "attention mechanism". An attention mechanism can be implemented via an attention layer that allows the decoder portion to, in a sense, "attend" to particular information during output generation.

It should be noted that the decoder portion of the local translation model may be a "greedy" decoder where a word that has the highest probability is typically selected as a translation (i.e., the algorithm is configured to act greedily). However, developers of the present technology have devised methods and systems that allow the decoder portion to generate a plurality of candidate translations of a word by iteratively "rolling back" the decoder portion into previous states for generating alternative sequences of output tokens for a given word. As it will be described in greater details herein further below, in a case where the translated word having the highest probability is determined to be a neologism, the decoder portion may be rolled back to a previous state and may generate an alternative sequence of output tokens representative of a different candidate translation.

In a first broad aspect of the present technology, there is provided a method of executing offline translation of a source word into a target word. The source word is in a source language, and the target word is in a target language. The offline translation is performed by a Neural Network (NN) executed by an electronic device. The NN has been trained to translate words from the source language to the target language. The NN has an encoder portion and a decoder portion. The method is executable by the electronic device. The method comprises splitting, by the electronic device, the source word into a sequence of input tokens. The method comprises generating, by the electronic device employing the encoder portion, a sequence of vector representations for respective ones from the sequence of input tokens. The method comprises generating, by the electronic device employing the decoder portion, a first sequence of output tokens based on the sequence of vector representations. The first sequence is representative of a first candidate word. The first candidate word is a candidate translation of the source word into the target language. The method comprises in response to the first candidate word not respecting at least one pre-determined rule, triggering the decoder portion to generate a second sequence of output tokens, the second sequence having a different at least one last output token than at least one last output token of the first sequence. The second sequence is representative of a second candidate word. The second candidate word is a second candidate translation of the source word into the target language. The method comprises in response to the second candidate word respecting the at least one pre-determined rule, determining, by the electronic device, that the second candidate word is the target word.

In some embodiments of the method, the method further comprises determining, by the electronic device, that the first candidate word does not respect the at least one pre-determined rule. The determining comprises comparing, by the electronic device, the first candidate word against a pre-determined vocabulary of words.

In some embodiments of the method, the method further comprises determining, by the electronic device, that the second candidate word does respect the at least one pre-determined rule. The determining comprises comparing, by the electronic device, the second candidate word against a pre-determined vocabulary of words.

In some embodiments of the method, the at least one last output token in the first sequence is at least two last output tokens in the first sequence.

In some embodiments of the method, the decoder portion includes an attention mechanism. The generating the first sequence of output tokens comprises generating, by the electronic device employing the decoder portion, a first output token in the first sequence based on the sequence of vector representations. The generating the first sequence of output tokens comprises providing, by the electronic device, an indication of the first output token to the attention mechanism of the decoder portion. The generating the first sequence of output tokens comprises generating, by the electronic device employing the decoder portion, a second output token in the first sequence based on the sequence of vector representations and the indication of the first output token. The first output token is a previous output token to the second output token in the first sequence. The second output token is generated by the decoder portion while taking into account at least the previous output token.

In some embodiments of the method, the triggering the decoder portion to generate the second sequence comprises triggering, by the electronic device, the decoder portion to return to a previous state. The previous state is a state of the decoder portion prior to generation of a first one of the at least one last output token from the first sequence. The triggering the decoder portion to generate the second sequence comprises generating, by the electronic device employing the decoder portion in the previous state, a first one of the at least one last output token of the second sequence while prohibiting the first one of the at least one last output token of the second sequence to be identical to the first one of the at least one last output token of the first sequence.

In some embodiments of the method, the triggering the decoder portion to return to the previous state comprises accessing, by the electronic device, previously-stored data associated with the decoder portion in a memory device.

In some embodiments of the method, the translation is performed by the electronic device without accessing a server.

In some embodiments of the method, the NN has a capacity factor below a pre-determined threshold.

In some embodiments of the method, the method comprises, in response to the second candidate word not respecting the at least one pre-determined rule, triggering, by the electronic device, the decoder portion to generate an other second sequence of output tokens. The other second sequence has a different at least one last output token than (i) the at least one last output token of the first sequence and (ii) the at least one last output token of the second sequence. The other second sequence is representative of an other second candidate word. The method comprises, in response to the other second candidate word respecting the at least one pre-determined rule, determining, by the electronic device, that the other second candidate word is the target word.

In some embodiments of the method, the method further comprises triggering, by the electronic device, the decoder portion to generate a pre-determined number of second sequences of output tokens. The pre-determined number of second sequences includes the second sequence and the other second sequence. The pre-determined number of second sequences is representative of a pre-determined number of second candidate words. The method further comprises in response to none of the pre-determined number of second candidate words respecting the at least one pre-determined rule, determining, by the electronic device, that the first candidate word is the target word.

In a second broad aspect of the present technology, there is provided an electronic device for executing offline translation of a source word into a target word. The source word is in a source language, and the target word is in a target language. The offline translation is performed by a Neural Network (NN) executed by the electronic device. The NN has been trained to translate words from the source language to the target language. The NN has an encoder portion and a decoder portion. The electronic device is configured to split the source word into a sequence of input tokens. The electronic device is configured to generate, by employing the encoder portion, a sequence of vector representations for respective ones from the sequence of input tokens. The electronic device is configured to generate, by employing the decoder portion, a first sequence of output tokens based on the sequence of vector representations. The first sequence is representative of a first candidate word. The first candidate word is a candidate translation of the source word into the target language. The electronic device is configured to, in response to the first candidate word not respecting at least one pre-determined rule, trigger the decoder portion to generate a second sequence of output tokens. The second sequence has a different at least one last output token than at least one last output token of the first sequence. The second sequence is representative of a second candidate word. The second candidate word is a second candidate translation of the source word into the target language. The electronic device is configured to, in response to the second candidate word respecting the at least one pre-determined rule, determine that the second candidate word is the target word.

In some embodiments of the electronic device, the electronic device is further configured to determine that the first candidate word does not respect the at least one pre-determined rule. The electronic device configured to determine comprises the electronic device configured to compare the first candidate word against a pre-determined vocabulary of words.

In some embodiments of the electronic device, the electronic device is further configured to determine that the second candidate word does respect the at least one pre-determined rule. The electronic device configured to determine comprises the electronic device configured to compare the second candidate word against a pre-determined vocabulary of words.

In some embodiments of the electronic device, the at least one last output token in the first sequence is at least two last output tokens in the first sequence.

In some embodiments of the electronic device, the decoder portion includes an attention mechanism. The electronic device configured to generate the first sequence of output tokens comprises the electronic device configured to generate, by employing the decoder portion, a first output token in the first sequence based on the sequence of vector representations. The electronic device configured to generate the first sequence of output tokens comprises the electronic device configured to provide an indication of the first output token to the attention mechanism of the decoder portion. The electronic device configured to generate the first sequence of output tokens comprises the electronic device configured to generate, by employing the decoder portion, a second output token in the first sequence based on the sequence of vector representations and the indication of the first output token. The first output token is a previous output token to the second output token in the first sequence. The second output token is generated by the decoder portion while taking into account at least the previous output token.

In some embodiments of the electronic device, the electronic device configured to trigger the decoder portion to generate the second sequence comprises the electronic device configured to trigger the decoder portion to return to a previous state. The previous state is a state of the decoder portion prior to generation of a first one of the at least one last output token from the first sequence. The electronic device is configured to generate, by employing the decoder portion in the previous state, a first one of the at least one last output token of the second sequence while prohibiting the first one of the at least one last output token of the second sequence to be identical to the first one of the at least one last output token of the first sequence.

In some embodiments of the electronic device, the electronic device configured to trigger the decoder portion to return to the previous state comprises the electronic device configured to access previously-stored data associated with the decoder portion in a memory device.

In some embodiments of the electronic device, the translation is performed by the electronic device without accessing a server.

In some embodiments of the electronic device, the NN has a capacity factor below a pre-determined threshold.

In some embodiments of the electronic device, in response to the second candidate word not respecting the at least one pre-determined rule, the electronic device is configured to trigger the decoder portion to generate an other second sequence of output tokens. The other second sequence has a different at least one last output token than (i) the at least one last output token of the first sequence and (ii) the at least one last output token of the second sequence. The other second sequence is representative of an other second candidate word. The electronic device is configured to, in response to the other second candidate word respecting the at least one pre-determined rule, determine that the other second candidate word is the target word.

In some embodiments of the electronic device, the electronic device is further configured to trigger the decoder portion to generate a pre-determined number of second sequences of output tokens. The pre-determined number of second sequences includes the second sequence and the other second sequence. The pre-determined number of second sequences is representative of a pre-determined number of second candidate words. In response to none of the pre-determined number of second candidate words respecting the at least one pre-determined rule, the electronic device is configured to determine that the first candidate word is the target word.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
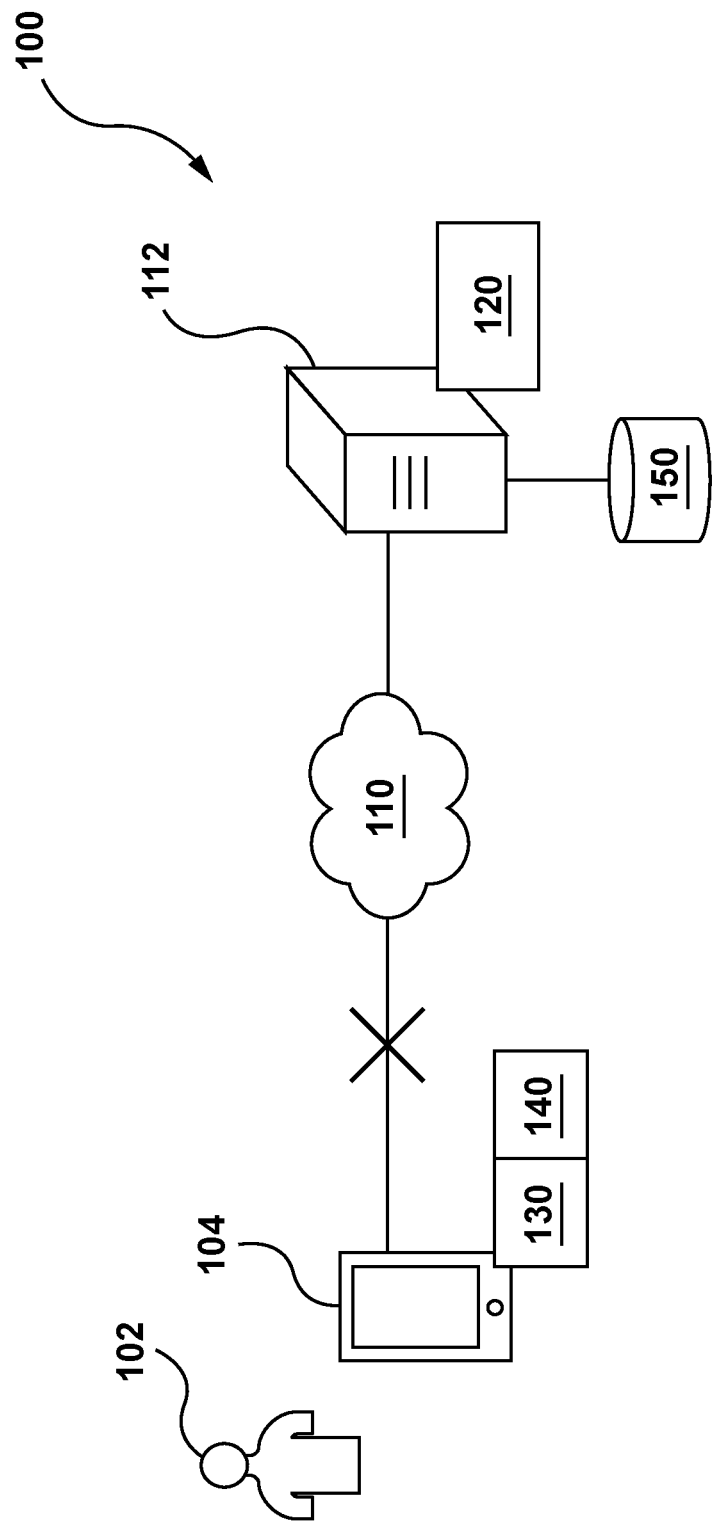
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide electronic translation services for a user 102 of an electronic device 104. For example, the system 100 may be configured to acquire a sentence in a source language, and provide a translated version of that sentence in a target language. At least some components of the system 100 will now be described, however, it should be understood that other components to those depicted in FIG. 1 may be part of the system 100 without departing from the scope of the present technology.

Communication Network

The electronic device 104 is communicatively coupled to a communication network 110 for communication with the server 112. For example, the electronic device 104 may be communicatively coupled with the server 112 via the communication network 110 for providing the user 102 with the translation services. The communication network 110 is configured to transmit inter alia requests and responses between the electronic device 104 and the server 112 in a form of one or more data packets comprising communication data.

In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the electronic device 104 and the communication network 110 is implemented will depend inter alia on how the electronic device 104 is implemented.

Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

It should be noted that, in some cases, the communication network 110 may not be able to transmit requests from the electronic device 104 to the server 112. For example, one or more communication links between the electronic device 104 and the server 112 may be down. In another example, the electronic device 104 and/or the server 112 may not be connected to the communication network. In a further example, the infrastructure providing communication between the server 112 and the electronic device 104 (e.g., physical layer) may be defective.

Irrespective of a specific reason why the electronic device 104 may not be able to access translation services hosted by the server 112, the electronic device 104 is configured to provide "offline" translation services to the user 102. As it will now be described in greater details, the electronic device 104 is configured to locally execute one or more computer-implemented algorithms and locally store data for providing translation services to the user 102, and in particular, when the electronic device 104 is unable to communicate with the server 112.

Electronic Device

The system 100 comprises the electronic device 104, the electronic device 104 being associated with the user 102. As such, the electronic device 104 can sometimes be referred to as a "client device", "end user device", "client electronic device" or simply "device". It should be noted that the fact that the electronic device 104 is associated with the user 102 does not need to suggest or imply any mode of operation—such as a need to log in, a need to be registered, or the like.

The implementation of the electronic device 104 is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways). The electronic device 104 comprises hardware and/or software and/or firmware (or a combination thereof), as is known in the art, to execute a browser application.

Generally speaking, the purpose of the browser application is to enable the user 102 to access one or more network resources, such as web pages, for example. How the browser application is implemented is not particularly limited. One example of the browser application may be embodied as a Yandex™ browser.

The user 102 may use the browser application for accessing a translation engine for translating one or more sentences from a source language to a target language. For example, the electronic device 104 may be configured to generate a request indicative of one or more sentences that the user 102 desires to be translated. Also, the electronic device 104 may be configured to receive a response (not depicted) for displaying a translated version of one or more sentences in the target language to the user 102.

Typically, the request and the response may be transmitted from and to the electronic device 104 via the communication network 110. However, as mentioned above, in some cases, the electronic device 104 may not be able to communicate with the server 112 via the communication network 110.

The electronic device 104 is configured to execute one or more Machine Learning Algorithms (MLAs) for providing offline translation services to the user 102. For example, the electronic device 104 is configured to execute a translation model 130 that is implemented as a given MLA. It can be said that the translation model 130 is a locally executed translation model by the electronic device 104. How the translation model 130 can be implemented in at least some embodiments of the present technology will be described in greater details herein further below.

The electronic device 104 comprises one or more local memory devices. It can be said that the electronic device 104 comprises a storage configured to store data to be used for providing offline translation services. As illustrated on FIG. 1, the electronic device 104 is configured to store a vocabulary 140.

Broadly speaking, the vocabulary 140 is a data structure comprising a large number of words in one or more languages and which can be used for verification purposes during offline translation. As it will be described in greater details herein further below, the vocabulary 140 may be employed by the electronic device 104 for verifying whether or not candidate translations of words from a source language to a target language correspond to a given word in the vocabulary 140. Such verification by the electronic device 104 may allow generating more than one candidate translation of a given source word and selecting a best candidate for provision to the user 102. In some embodiments such verification process and generation of more than one candidate translation of a given source word may increase the quality of offline translation services provided by the electronic device 104. For example, this verification process and generation of more than one candidate translation of a given source word may allow reducing a number of neologisms generated by the translation model 130.

Server and Database

The system 100 also comprises the server 112 that can be implemented as a conventional computer server. In the depicted non-limiting embodiments of the present technology, the server 112 is a single server. In alternative non-limiting embodiments of the present technology, functionalities of the server 112 may be distributed and may be implemented via multiple servers. The server 112 may include one or more processors, one or more non-transitory memory devices, computer-readable instructions, and/or additional hardware components, additional software components, and/or combination thereof, for implementing various functionalities of the server 112, without departing from the scope of the present technology.

The system 100 also comprises a database 150 which is communicatively coupled to the server 112 and is configured to store information extracted or otherwise determined or generated by the server 112. Generally speaking, the database 150 may receive data from the server 112 which was extracted or otherwise determined or generated by the server 112 during processing for temporary and/or permanent storage thereof and may provide stored data to the server 112 for use thereof. It is contemplated that the database 150 may be split into several distributed databases without departing from the scope of the present technology.

The database 150 may be configured to store data for supporting translation services providable by the translation engine of the server 112.

Generally speaking, the server 112 can be under control and/or management of a translation service provider (not depicted), such as, for example, an operator of Yandex™ translation services. It is contemplated that the provider of the translation services and the provider of the browser application may be the same provider. For example, the browser application (e.g., Yandex™ browser) and the translation services (e.g., Yandex™ translation services) may be provided, controlled and/or managed by the same operator or entity.

As mentioned above, the server 112 hosts a translation engine. Broadly speaking, the translation engine is embodied as a plurality of computer-implemented procedures that are configured for translating one or more sentences from a source language into a target language. For example, the server 112 may be configured to execute a translation model 120 and implemented as a given MLA. It can be said that the translation model 130 is a translation model 130 that is executed remotely to the electronic device 104.

Machine Learning Algorithms

Generally speaking, MLAs can learn from training samples and make predictions on new (unseen) data. The MLAs are usually used to first build a model based on training inputs of data in order to then make data-driven predictions or decisions expressed as outputs, rather than following static computer-readable instructions.

The MLAs are commonly used as estimation models, translation models, classification models and the like. It should be understood that different types of the MLAs having different structures or topologies may be used for various tasks.

One particular type of MLAs includes Neural Networks (NNs). Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than trying to determine complex statistical arrangements or mathematical algorithms for a given situation; the given NN tries to provide an "intuitive" answer based on a "feeling" for a situation.

NNs are commonly used in many such situations where it is only important to know an output based on a given input, but exactly how that output is derived is of lesser importance or is unimportant. For example, NNs are commonly used to optimize the distribution of web-traffic between servers, automatic text translation into different languages, data processing, including filtering, clustering, vector embedding, and the like.

Furthermore, the implementation of a given MLA can be broadly categorized into two phases—a training phase and an in-use phase. First, the given MLA is trained in the training phase. Then, once the given MLA knows what data to expect as inputs and what data to provide as outputs, the given MLA is actually run using in-use data in the in-use phase.

As mentioned above, both the electronic device 104 and the server 112 execute MLAs. More particularly, the electronic device 104 executes the translation model 130 and the server 112 executes the translation model 120. How the translation model 120 is implemented by the server 112 is not particularly limiting. However, it should be noted that the translation model 120 has a comparatively higher capacity than the translation model 130.

Broadly speaking, a capacity of a machine learned model refers to a range or scope of the types of functions that the model can approximate. The translation model 120 can have a comparatively higher capacity than the translation model 130 due to inter alia availability of comparatively more computational resources for training and executing the translation model 130. For example, due to limited local computational resources of the electronic device 104 if compared to the server 112, the translation model 130 executed locally (on the electronic device 104) may have less parameters or may learn less rules than the translation model 120 executed remotely (on the server 112).

It should be noted that at least partially due to comparatively lower capacity, locally executed translation models, such as the translation model 130, may be prone to generating "neologisms". Broadly speaking, neologisms correspond to words that do not exist and/or that have been used only recently and/or have not yet entered common use or mainstream language.

Without wishing to be bound to any specific theory, developers of the present technology have devised computer-implemented methods and systems that allow increasing the quality of translation services of locally executed translation models by reducing a number of neologisms generated thereby during offline translation.

In some embodiments of the present technology, the translation model 130 may be an encoder-decoder type machine learned model. For example, an encoder portion of such models may be dedicated to source languages while a decoder portion of such models may be dedicated to target languages. In other embodiments, it can be said that the electronic device 104 may be also configured to execute a seq2seq type model, and a transformer type model.

Figure 2:
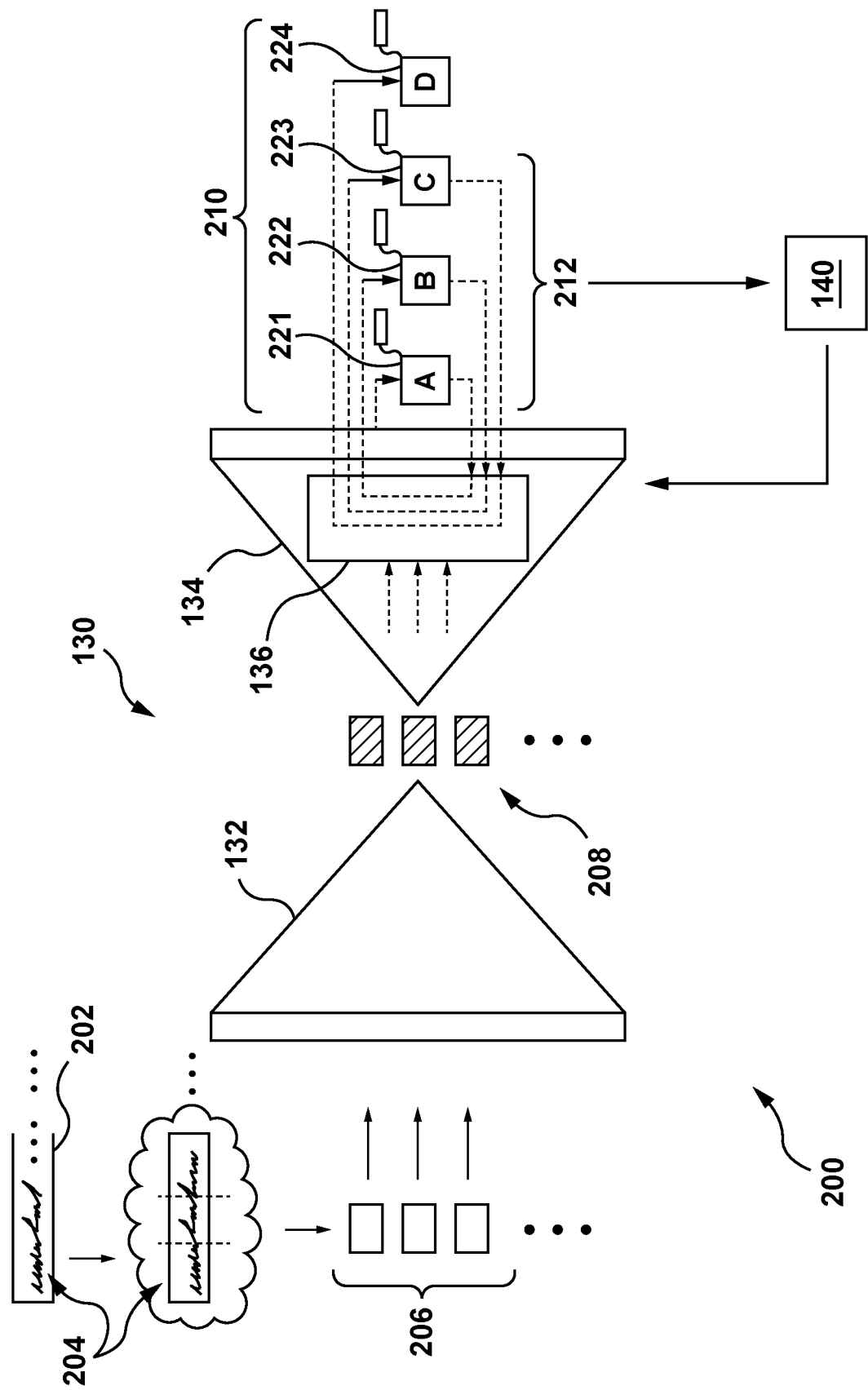
FIG. 2 depicts a representation of a translation model of the system of FIG. 1 for generating a first sequence of output tokens, in accordance with some non-limiting embodiments of the present technology.

With reference to FIG. 2, there is depicted an encoder portion 132 (or simply "encoder") and a decoder portion 134 (or simply "decoder") of the translation model 130. Broadly speaking, the encoder 132 receives a sequence of input tokens generated based on text in the source language and produces a compact representation of that input sequence, trying to summarize or condense all of its information. These compact representations are received by the decoder portion 134 in its initial state, and which can also receive other external inputs as it will be described in greater details below. At each step, the decoder portion 134 generates an element of its output sequence (an output token) based on the inputs received and its current state, and updates its own state for the next step where an other element of the output sequence is generated (a next output token).

As depicted in FIG. 2, the decoder portion 134 is implemented with an "attention mechanism" 136. The attention mechanism 136 can be implemented via an attention layer that allows the decoder portion 134 to, in a sense, "attend" to particular information during output generation as it will be described herein further below.

In some embodiments of the present technology, the decoder portion 134 may be a "greedy" decoder. For example, the decoder portion 134 may be configured to generate a given output sequence representative of a word in a target language and which has the highest probability (i.e., act greedily) of being a translation of respective word in a source language.

As it will become apparent from the description herein further below, if a given sequence of output tokens is representative of a neologism, the electronic device 104 may be configured to "roll back" the decoder portion 134 into a given previous state for generating an alternative sequence of output tokens representative of a different word in a target language. It is contemplated that the electronic device 104 may be configured to iteratively roll back the decoder for iteratively generating a number of translation candidates of a given source word.

How the electronic device 104 employs the translation model 130 for generating a translation of a source word 204 from a source sentence 202 will now be described.

The electronic device 104 is configured to split words from the source sentence 202 into sequences of input tokens. For example, the electronic device 104 may be configured to split the source word 204 into a sequence of input tokens 206, a next word from the source sentence 202 into an other sequence of input tokens, and so forth. It can be said that the electronic device 104 may be configured to split a given source word into one or more sub-word units. Hence, it can be said that the sequence of input tokens 206 may correspond to a sequence of sub-word units generated by the electronic device 104 based on the source word 204.

The electronic device 104 is configured to provide input tokens generated based on the source sentence 202 into the encoder portion 132. The encoder portion 132 is configured to generate hidden vector representations based on the inputted tokens. It can be said that these hidden vector representations summarize and/or condense information about words in the source sentence 202. For example, the electronic device 104 employing the encoder portion 132 may be configured to generate a vector representations 208 for the sequence of input tokens 206 associated with the source word 204.

The electronic device 104 is configured to provide vector representations to the decoder portion 134. The decoder portion 134 is configured to generate output tokens based on inter alia vector representations generated by the encoder portion 132 and other inputs, such as previously generated output tokens, for example. Output tokens generated by the decoder portion 134 may be used by the electronic device 104 for providing a translation of the source sentence 202 (i.e., a target sentence) to the user 102.

As it will now be described in greater details, the decoder portion 134 may generate more than one candidate translation of the source word 204 and select one of those candidates as a target word in the target language to be provided to the user 102 as a translation of the source word 204.

How the electronic device 104 employs the decoder portion 134 for generating a first candidate translation of the source word 204 will be described with reference to FIG. 2, and how the electronic device 104 employs the decoder portion 134 for generating a second candidate translation of the source word 204 will be described with reference to FIG. 3.

The decoder portion 134 is configured to use the sequence of vector representations 208 for generating a first output token 221. It can be said that the decoder portion 134 is in a first state after generating the first output token 221. At the next step, the decoder portion 134 is configured to further use the first output token 221 (additional input) for generating a second output token 222. It can be said that the decoder portion 134 is in a second state after generating the second output token 222. At the next step, the decoder portion 134 is configured to further use the second output token 222 (additional input) for generating a third output token 223. It can be said that the decoder portion 134 is in a third state after generating the third output token 223. At the next step, the decoder portion 134 is configured to further use the third output token 223 (additional input) for generating a fourth output token 224, and so forth. It can be said that the decoder portion 134 is in a fourth state after generating the fourth output token 224.

As previously alluded to, the electronic device 104 may make use of the attention mechanism 136 for taking into account previous output tokens generated by the decoder portion 134 for generating a current output token in a sequence of output tokens. In some embodiments, the decoder portion 134 may be configured to use one or more output tokens generated by the decoder portion 134 and which are associated with the current and/or previous words generated by the decoder portion 134.

It can be said that the electronic device 104 is configured to generate, by employing the decoder portion 134, a sequence of output tokens 210 based on inter alia the vector representations 208 as well as previous output tokens in the sequence of output tokens 210 for generating a current output token from the sequence of output tokens 210.

Information indicative of a given state of the decoder portion 134 can be stored in a memory device for a later use thereof. For example, the electronic device 104 may store information indicative of the fourth state of the decoder portion 134 in memory, in addition to previous states of the decoder portion 134 (the first state, the second state, and the third state).

It is contemplated that in some embodiments of the present technology, the translation model 130 may be configured to perform greedy decoding of data (as opposed to beam search decoding, for example) with one or more roll back procedures to previous states of the decoder portion 134 for generating one or more candidate translations of a given source word. How a given roll back procedure may be triggered by the electronic device 104 will be discussed in greater details below.

It should be noted that the decoder portion 134 is configured to generate output tokens of at least two distinct types. More particularly, the decoder portion 134 can generate a given output token that is identifiable as a "start-type" output token and a "continuation-type" output token. Broadly speaking, a given start-type output token is a given output token that corresponds to an initial output token of a given translated word, while a given continuation-type output token is a given output token that does not correspond to an initial output token of a given translated word. Put another way, a given translated word begins with a respective start-type output token and can potentially continue with one or more continuation-type output token(s).

For example, the decoder portion 134 may output the first output token 221 that is identifiable as a given start-type output token. The decoder portion 134 may output the second output token 222 that is identifiable as a given continuation-type output token. The decoder portion 134 may output the third output token 223 that is identifiable as a given continuation-type output token. The decoder portion 134 may output the fourth output token 224 that is identifiable as a given start-type output token. The electronic device 104 may be configured to use information indicative of types of output tokens for determining a first sequence of output tokens 212 corresponding to a first candidate translation of the source word 204.

For example, the electronic device 104 may determine that, since the fourth output token 224 is identifiable as a given start-type output token, the first candidate translation of the source word 204 begins with the first output token 221 and ends with the third output token 223 because the fourth output token 224 corresponds to the beginning of a next word. As a result, the electronic device 104 may be configured to determine that a first sequence of output tokens 212, a subsequence within the sequence of output tokens 210, corresponds to a first candidate translation of the source word 204 into the target language.

The electronic device 104 is configured to compare the first sequence of output tokens 212 representative of a first candidate translation against at least one pre-determined rule for determining whether the first candidate translation is desirable to be provided as a translation of the source word 204 into the target language.

In at least one embodiment of the present technology, the electronic device 104 may be configured to access the vocabulary 140 and compare the first candidate translation corresponding to the first sequence of output tokens 212 against the vocabulary of words contained therein. In this embodiment, it can be said that the pre-determined rule that the electronic device 104 is configured to verify is a match between a given one of a pre-determined vocabulary of words and a given candidate translation. It can also be said that the electronic device 104 applying the pre-determined rule is configured to verify whether or not the given candidate translation matches one of the words from the pre-determined vocabulary of words.

If there is no match between the vocabulary of words and the first candidate translation, the electronic device 104 may be configured to determine that the first candidate translation is undesirable. In some embodiments, performing such a comparison by the electronic device 104 may allow the electronic device 104 to determine whether the first candidate translation is a neologism.

As previously alluded to, the vocabulary 140 can be embodied as a data structure comprising a pre-determined vocabulary of words. For example, the words from the pre-determined vocabulary of words may be pre-selected by a human operator. In some embodiments, the pre-determined vocabulary of words may be predetermined by an operator of a translation engine associated with the server 112. For example, an indication of the pre-determined vocabulary of words may be provided to the electronic device 104 via the communication network 110 at a moment in time when the electronic device 104 is in communication with the server 112.

In some embodiments of the present technology, the pre-determined vocabulary of words may comprise company names, acronyms, and at least some neologisms that are desirable by the human operator as a translation candidate. For example, a neologism such as "LGBTQism" may be considered as desirable by the operator and the operator may include such a desired neologism to the pre-determined vocabulary of words.

Let it be assumed that after comparing the first sequence of output tokens 212 against the vocabulary 140, the electronic device 104 has not found a match. In such a case, the electronic device 104 may trigger the decoder portion 134 to generate a second candidate translation. For example, the electronic device 104 may trigger the decoder portion 134 to return to a given previous state thereof so that the decoder portion 134 generates a second, different, sequence of output tokens.

Figure 3:
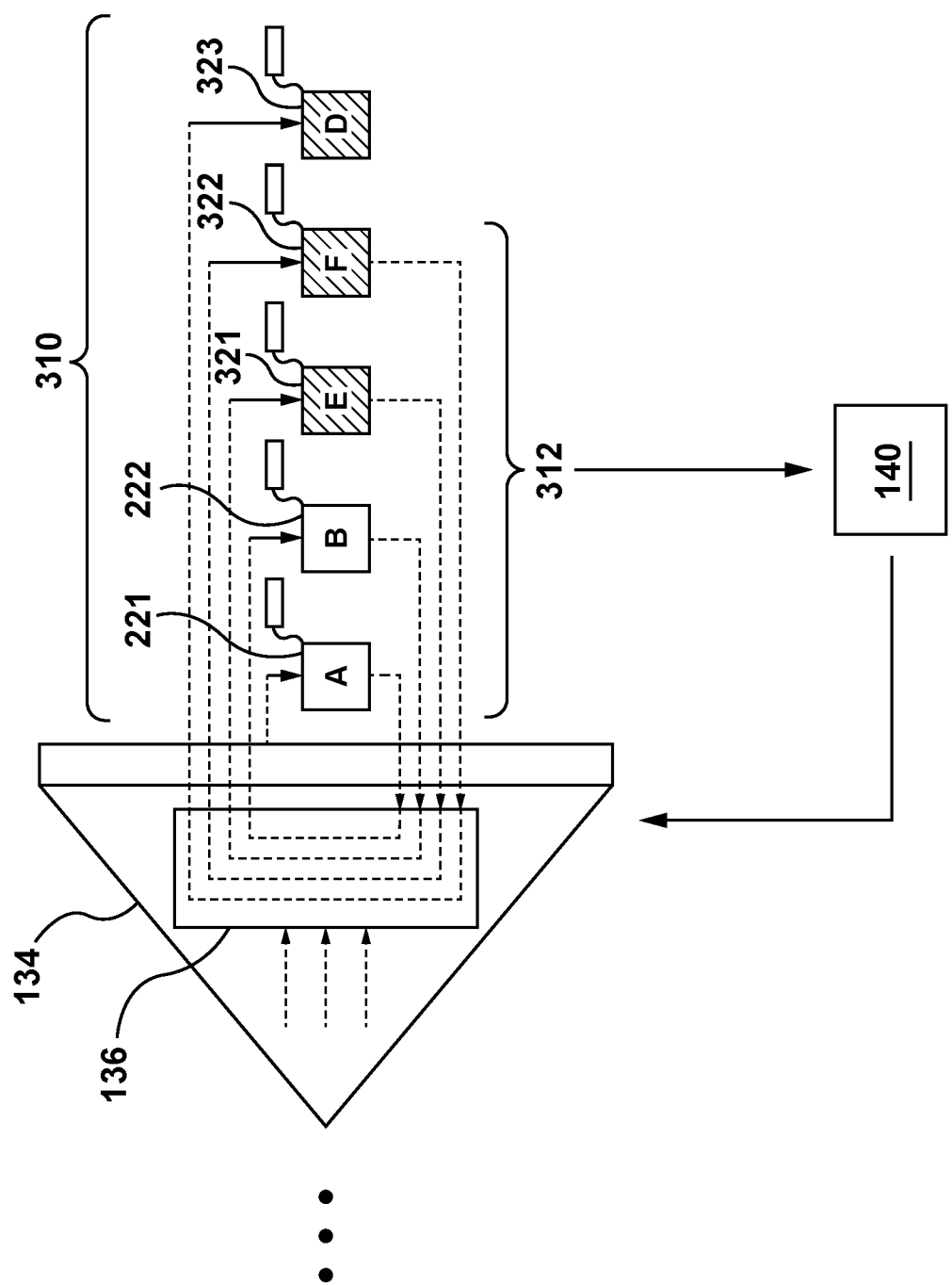
FIG. 3 depicts a representation of a decoder portion of the translation model of FIG. 2 generating a second sequence of output tokens, in accordance with some non-limiting embodiments of the present technology.

As illustrated in FIG. 3, the electronic device 104 may trigger the decoder portion 134 to roll back to the second state thereof, a state prior to the generation of the last one from the first sequence of output tokens 212—that is, to the second state of the decoder portion 134 in which it found itself prior to generating the third output token 223. For example, to that end, the electronic device 104 may access previously-stored data associated with the decoder portion 134 in a memory device.

The decoder portion 134 is configured to generate new output tokens (in addition to the first output token 221 and the second output token 222) while prohibiting the next new output token to be identical to the third output token 223.

In this example, let it be assumed that the decoder portion 134 may output a new output token 321 identifiable as a given continuation-type output token, a new output token 322 identifiable as a given continuation-type output token, and a new output token 323 identifiable as a given start-type output token. As such, after the roll back procedure, it can be said that the electronic device 104 generates new output tokens in addition to the first output token 221 and the second output token 222, which together are depicted as a partially new sequence of output tokens 310.

The electronic device 104 may be configured to use information indicative of types of output tokens from the partially new sequence of output tokens 310 for determining a second sequence of output tokens 312 corresponding to a second candidate translation of the source word 204, as explained above.

The electronic device 104 may be configured to compare the second candidate translation of the source word 204 against the vocabulary 140. If a match is found, the electronic device 104 may identify the second candidate translation of the source word 204 as a correct translation of the source word 204 for provision to the user 102. If no match is found, the electronic device 104 may be configured to perform an other roll back procedure for generating a third sequence of output tokens corresponding to a third candidate translation of the source word 204, and so forth.

It should be noted that the electronic device 104 may be configured to roll back the decoder portion 134 to the second state thereof more than once for generating additional candidates of translation. This means, that the electronic device 104 may trigger the decoder portion 134 to generate more than one partially new sequences of output tokens (such as the partially new sequence of output tokens 310) that all begin with the first output token 221 and the second output token 222. However, as mentioned above, the more than one partially new sequences of output tokens generated following respective roll backs to the second state of the decoder portion 134 will have different subsequent output tokens to the second output token 222.

It should also be noted that the electronic device 104 does not necessarily need to roll back to the second state of the decoder portion 134 for generating additional candidates. For example, the electronic device 104 may be configured to roll back the decoder portion to the first state thereof—that is, to the state of the decoder portion 134 prior to generating the second output token 222. Following such a roll back to the first state of the decoder portion 134 (as opposed to the second state thereof), the decoder portion 134 may be configured to generate an other partially new sequence of output tokens, similarly to how the partially new sequence of tokens 310 is generated, but where the other partially new sequence of output tokens begins with the first output token 221 and continues with a new output token that is different from the second output token 222.

Therefore, in some embodiments, it can be said that the electronic device 104 may trigger the decoder portion 134 to roll back to a given previous state thereof and which is a state of the decoder portion 134 prior to generation of a first one of at least one last output token from the first sequence of output tokens 212. In the example illustrated on FIG. 3, the at least one last output token from the first sequence of output tokens 212 is the third output token 223. However, as alluded to above, the at least one last output token from the first sequence of output tokens 212 may be the second output token 222 and the third output token 223 (in examples where the decoder portion is rolled back to first state thereof).

In some embodiments of the present technology, the electronic device 104 may be configured to perform a pre-determined number of roll back procedures if no match is found between the so-generated candidates of translation and the vocabulary 140. For example, the electronic device 104 may be configured to roll back the decoder portion 134 to the second state thereof, three times, which allows generating three new candidates of translation for the source word 204, and roll back the decoder portion 134 to the first state thereof, six times, which allows generating six new candidates in addition to the three new candidates of translations. In this example, the decoder portion 134 may generate ten candidates of translation in total for the source word 204—that is, the first candidate generated prior to the roll backs, and the nine new candidates following the respective roll backs.

It is contemplated that in some embodiments, if no match is found between a pre-determined number of so-generated candidate translations of the source word 204 and the vocabulary 140, the electronic device 104 may be configured to select the first candidate translation generated by the decoder portion 134 as a correct translation of the source word 204.

Figure 4:
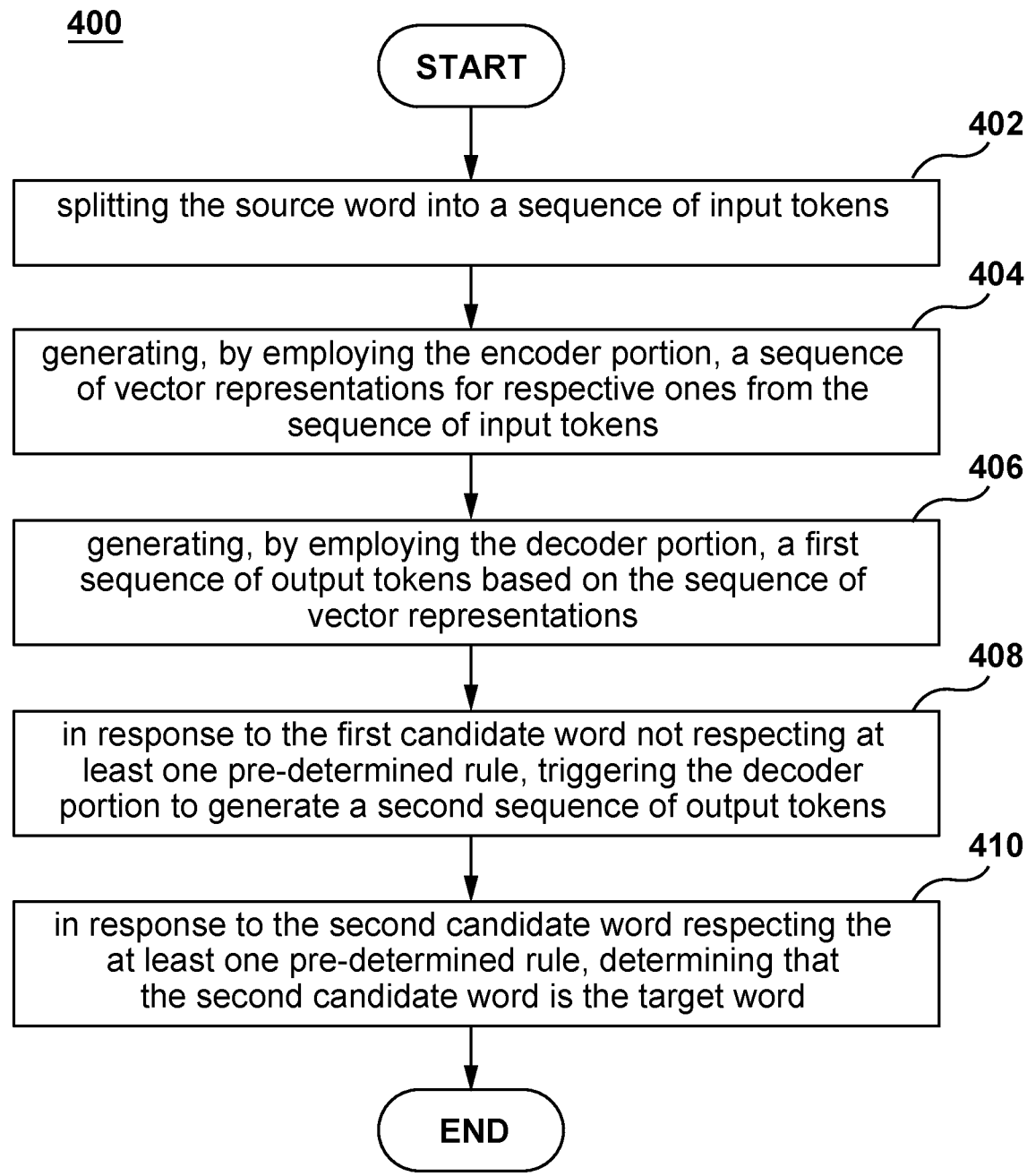
FIG. 4 depicts a scheme-block representation of a method performed by the system of FIG. 1, in accordance with some non-limiting embodiments of the present technology.

With reference to FIG. 4, there is provided a schematic representations of a method 400 executable by the electronic device 104. In the context of the present technology, the electronic device 104 is configured to execute the translation model 130. It can be said that the electronic device 130 is configured to locally execute the translation model 130.

In some embodiments of the present technology, the translation model may be built by training a NN to translate sentences from a source language to a target language. The source language and the target language may be selected by an operator during the training phase of the NN. It is contemplated that the translation model 130 may comprise the encoder portion 132 configured to encoder input data into a compact representation thereof, and the decoder portion 134 configured to use the compact representation and other external inputs for decoding data and thereby generating an output of the translation model 130. In some embodiments of the present technology, the decoder is configured to execute the attention mechanism 136 for attending to previously generated output tokens when generating a current output token. It can be said that the decoder portion 134 may be configured to perform greedy decoding of data. It can also be said that the decoder portion 134 may be implemented as a greedy decoder that is configured to be selectively rolled back to previous states thereof for generating a plurality of candidate translations of a given source word. The electronic device 104 may be configured to selectively trigger roll backs of the decoder portion based on one or more pre-determined rules. In one embodiment, at least one pre-determined rule may be met when a given candidate translation matches one of a pre-determined vocabulary of words locally stored on a memory device of the electronic device 104. The electronic device 104 may also be configured to access the memory device when rolling back the decoder portion 134 to one or more previous states thereof.

In some embodiments of the present technology, the electronic device 104 may be configured to perform translation without accessing the server 112. It is contemplated that the local translation model 103 (e.g., trained NN) has a capacity factor below a pre-determined threshold. It can also be said that the capacity factor of the local translation model 130 is inferior to the capacity factor of the remote translation model 120 executable by the server 112. Various steps of the method 400 will now be described in greater details herein below.

Step 402: Splitting the Source Word into a Sequence of Input Tokens

The method 400 begins at step 402 with the electronic device 104 configured to split the source word 204 into a sequence of input tokens 206. In some embodiments of the present technology, it can be said that the electronic device 104 may be configured to employ a word splitting algorithm for generating a sequence of sub-word units based on the source word 204. It should be noted that the sequence of input tokens 206 may be inputted into the translation model 130 via an input layer (not numbered) of the encoder portion 132.

Step 404: Generating, by Employing the Encoder Portion, a Sequence of Vector Representations for Respective Ones from the Sequence of Input Tokens The method 400 continues to step 404 with the electronic device 104 configured to generate, by employing the encoder portion 132, a sequence of vector representations 208 for respective ones from the sequence of input tokens 206.

In some embodiments, it can be said that the encoder portion 132 of the translation model 130 is configured to (i) receive a given sequence of input tokens generated based on text in the source language and (ii) produce a compact representation of that input sequence, trying to summarize or condense all of its information. These compact representations can be inputted into the decoder portion 134 of the translation model 130, in addition to other inputs as explained herein.

Step 406: Generating, by Employing the Decoder Portion, a First Sequence of Output Tokens Based on the Sequence of Vector Representations The method 400 continues to step 406 with the electronic device 104 configured to generate, by employing the decoder portion 134, the first sequence of output tokens 212 based on the sequence of vector representations 208. It should be noted that the first sequence of output tokens 212 is representative of a first candidate word. The first candidate word is a candidate translation of the source word 204 into the target language.

In some embodiments, it can be said that the electronic device 104 may be configured to generate respective output tokens from the first sequence of output tokens 212 based on the sequence of vector representation 208 and information indicative of previously-generated output tokens from the first sequence of output tokens 212.

In other embodiments of the present technology, the decoder portion 134 comprises the attention mechanism 136. The electronic device 104 generating the first sequence of output tokens 212 may be configured to generate, by employing the decoder portion 134, the first output token 221 in the first sequence 212 based on the sequence of vector representations 208. The electronic device 104 may be configured to provide an indication of the first output token 221 to the attention mechanism 136 of the decoder portion 134 (e.g., an external input). The electronic device 104 may be configured to generate, by employing the decoder portion 134, the second output token 222 in the first sequence 212 based on the sequence of vector representations 208 and the indication of the first output token 221. The first output token 221 is a previous output token to the second output token 222 in the first sequence 212. The second output token 222 is generated by the decoder portion 134 while taking into account at least the previous output token.

Step 408: In Response to the First Candidate Word not Respecting at Least One Pre-Determined Rule, Triggering the Decoder Portion to Generate a Second Sequence of Output Tokens The method 400 continues to step 408 with the electronic device 104 configured to, in response to the first candidate word not respecting at least one pre-determined rule, trigger the decoder portion 134 to generate the second sequence of output tokens 312. The second sequence 312 has a different at least one last output token than at least one last output token of the first sequence 212. The second sequence 312 is representative of a second candidate word. The second candidate word is a second candidate translation of the source word 204 into the target language.

In some embodiments of the present technology, the method 400 may comprises the electronic device 104 configured to determine that the first candidate word does not respect the at least one pre-determined rule. For example, the electronic device 104 may be configured to determine that one pre-determined rule is met if a given candidate word matches a given one of a pre-determined vocabulary of words. It should be noted that the pre-determined vocabulary of words may be stored locally one the electronic device 104. For example, the pre-determined vocabulary of words may be stored in a structured manner (e.g., the vocabulary 140) on the memory device of the electronic device 104.

It is contemplated that the electronic device 104 determining whether or not the first candidate word respects the at least one pre-determined rule may be configured to compare the first candidate word against the pre-determined vocabulary of words.

In some embodiments of the present technology, the electronic device 104 triggering the decoder portion 134 to generate the second sequence 312 may be configured to trigger the decoder portion 134 to return to a previous state thereof. The previous state is a state of the decoder portion 134 prior to generation of a first one of the at least one last output token from the first sequence 212.

In some embodiments, the electronic device 104 triggering the decoder portion 134 to return to the previous state may be configured to access previously-stored data associated with the decoder portion 134 in the memory device. For example, the electronic device 104 may be configured to locally store data indicative of respective states of the decoder portion 134 during the generation of the first sequence of output tokens 212 in the memory device of the electronic device 104. It can be said that the electronic device 104 trigger the decoder portion 134 to return to the previous state may correspond to the electronic device 104 triggering a roll back procedure of the decoder portion 134.

In the non-limiting illustrated example of FIGS. 2 and 3, the at least one last output token from the first sequence 212 is one last output token from the first sequence 212 and which corresponds to the third output token 223. In this example, the electronic device 104 is configured to trigger the decoder portion 134 to return to the second state thereof, the state of the decoder portion 134 prior to generating the third output token 223 and/or the state of the decoder portion 134 following generation of the second output token 222.

It should be noted that the electronic device 104 may be configured to generate, by employing the decoder portion 134 in the previous state, a first one of the at least one last output token of the second sequence 312 while prohibiting the first one of the at least one last output token of the second sequence 312 to be identical to the first one of the at least one last output token of the first sequence 212.

In the non-limiting illustrated example of FIGS. 2 and 3, the first one of the at least one last output token of the second sequence 312 being generated by the decoder portion 134 is the new output token 321. In this example, the decoder portion 134 may be prohibited from generating the new output token 321 such that it is identical to the third output token 223.

It should be noted that the first sequence 212 and the second sequence 312 may not comprise a same number of output tokens. For example, the first sequence 212 comprises three output tokens while the second sequence 312 comprises four output tokens. However, it should be noted that the second sequence 312 can be said to be a partially different sequence of output tokens to the first sequence of output tokens 212 since both the first sequence 212 and the second sequence 312 both begin with the first output token 221 and the second output token 222.

Furthermore, in some embodiments, the at least one last output token in the first sequence 212 may be at least two last output tokens in the first sequence 212. This means that when the electronic device 104 triggers the decoder portion 134 to return to a previous state thereof, the electronic device 104 may trigger the decoder portion 134 to return to other previous states than the second state thereof. For example, the electronic device 104 may roll back the decoder portion 134 to the first state thereof, prior to generating the second output token 222 and/or following generation of the first output token 221. In such an example, an other second sequence of output tokens may be generated by the decoder portion 134 and where the other second sequence of output tokens begins with the first output token 221, such as the first sequence 212, but continues with a new output token that is different from the second output token 222.

Step 410: In Response to the Second Candidate Word Respecting the at Least One Pre-Determined Rule, Determining that the Second Candidate Word is the Target Word The method 400 continues to step 410 with the electronic device 104 configured to, in response to the second candidate word respecting the at least one pre-determined rule, determine that the second candidate word is the target word. The electronic device 104 may be configured to display the target word to the user 102 as a translation of the source word 204.

In some embodiments, the electronic device 104 may be configured to compare the second candidate word against the pre-determined vocabulary of words. In further embodiments, in response to the second candidate word not respecting the at least one pre-determined rule, the electronic device 104 may be configured to trigger the decoder portion 134 to generate an other second sequence of output tokens. The other second sequence has a different at least one last output token than (i) the at least one last output token of the first sequence and (ii) the at least one last output token of the second sequence. The second sequence is representative of an other second candidate word.

The electronic device 104 may be configured to, in response to the other second candidate word respecting the at least one pre-determined rule, determine that the other second candidate word is the target word.

In some embodiments, the electronic device 104 may be configured to trigger the decoder portion 134 to generate a pre-determined number of second sequences of output tokens, similarly to how the electronic device 104 is configured to trigger the decoder portion 134 to generate the second sequence 312 and/or the other second sequence. The pre-determined number of second sequences can comprise the second sequence and the other second sequence and is representative of a pre-determined number of second candidate words. The pre-determined number of second sequences may be determined by the operator. The electronic device 104 may be configured to, in response to none of the pre-determined number of second candidate words respecting the at least one pre-determined rule, determine that the first candidate word is the target word.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of executing offline translation of a source word into a target word, the source word being in a source language, the target word being in a target language, the offline translation being performed by a Neural Network (NN) executed by an electronic device, the NN having been trained to translate words from the source language to the target language, the NN having an encoder portion and a decoder portion, the method executable by the electronic device, the method comprising:
   splitting, by the electronic device, the source word into a sequence of input tokens;
   generating, by the electronic device employing the encoder portion, a sequence of vector representations for respective ones from the sequence of input tokens;
   generating, by the electronic device employing the decoder portion, a first sequence of output tokens based on the sequence of vector representations,
      the first sequence being representative of a first candidate word, the first candidate word being a candidate translation of the source word into the target language;
   in response to the first candidate word not respecting at least one pre-determined rule:
      triggering the decoder portion to generate a second sequence of output tokens, the second sequence having a different at least one last output token than at least one last output token of the first sequence,
         the second sequence being representative of a second candidate word, the second candidate word being a second candidate translation of the source word into the target language;
      in response to the second candidate word respecting the at least one pre-determined rule:
         determining, by the electronic device, that the second candidate word is the target word.

2. The method of claim 1, wherein the method further comprises:
   determining, by the electronic device, that the first candidate word does not respect the at least one pre-determined rule, the determining comprising:
      comparing, by the electronic device, the first candidate word against a pre-determined vocabulary of words.

3. The method of claim 1, wherein the method further comprises:
   determining, by the electronic device, that the second candidate word does respect the at least one pre-determined rule, the determining comprising:
      comparing, by the electronic device, the second candidate word against a pre-determined vocabulary of words.

4. The method of claim 1, wherein the at least one last output token in the first sequence is at least two last output tokens in the first sequence.

5. The method of claim 1, wherein the decoder portion includes an attention mechanism, and wherein the generating the first sequence of output tokens comprises:
   generating, by the electronic device employing the decoder portion, a first output token in the first sequence based on the sequence of vector representations;
   providing, by the electronic device, an indication of the first output token to the attention mechanism of the decoder portion; and
   generating, by the electronic device employing the decoder portion, a second output token in the first sequence based on the sequence of vector representations and the indication of the first output token,
      the first output token being a previous output token to the second output token in the first sequence, the second output token being generated by the decoder portion while taking into account at least the previous output token.

6. The method of claim 1, wherein the triggering the decoder portion to generate the second sequence comprises:
   triggering, by the electronic device, the decoder portion to return to a previous state,
      the previous state being a state of the decoder portion prior to generation of a first one of the at least one last output token from the first sequence; and
   generating, by the electronic device employing the decoder portion in the previous state, a first one of the at least one last output token of the second sequence while prohibiting the first one of the at least one last output token of the second sequence to be identical to the first one of the at least one last output token of the first sequence.

7. The method of claim 6, wherein the triggering the decoder portion to return to the previous state comprises:
   accessing, by the electronic device, previously-stored data associated with the decoder portion in a memory device.

8. The method of claim 1, wherein the translation is performed by the electronic device without accessing a server.

9. The method of claim 1, wherein the NN has a capacity factor below a pre-determined threshold.

10. The method of claim 1, wherein the method comprises, in response to the second candidate word not respecting the at least one pre-determined rule:
   triggering, by the electronic device, the decoder portion to generate an other second sequence of output tokens,
      the other second sequence having a different at least one last output token than (i) the at least one last output token of the first sequence and (ii) the at least one last output token of the second sequence, the other second sequence being representative of an other second candidate word;

in response to the other second candidate word respecting the at least one pre-determined rule:

determining, by the electronic device, that the other second candidate word is the target word.

11. The method of claim 10, wherein the method further comprises:

triggering, by the electronic device, the decoder portion to generate a pre-determined number of second sequences of output tokens, the pre-determined number of second sequences including the second sequence and the other second sequence, the pre-determined number of second sequences being representative of a pre-determined number of second candidate words;

in response to none of the pre-determined number of second candidate words respecting the at least one pre-determined rule:

determining, by the electronic device, that the first candidate word is the target word.

12. An electronic device for executing offline translation of a source word into a target word, the source word being in a source language, the target word being in a target language, the offline translation being performed by a Neural Network (NN) executed by the electronic device, the NN having been trained to translate words from the source language to the target language, the NN having an encoder portion and a decoder portion, the electronic device being configured to:

split the source word into a sequence of input tokens;

generate, by employing the encoder portion, a sequence of vector representations for respective ones from the sequence of input tokens;

generate, by employing the decoder portion, a first sequence of output tokens based on the sequence of vector representations, the first sequence being representative of a first candidate word, the first candidate word being a candidate translation of the source word into the target language;

in response to the first candidate word not respecting at least one pre-determined rule:

trigger the decoder portion to generate a second sequence of output tokens, the second sequence having a different at least one last output token than at least one last output token of the first sequence, the second sequence being representative of a second candidate word, the second candidate word being a second candidate translation of the source word into the target language;

in response to the second candidate word respecting the at least one pre-determined rule:

determine that the second candidate word is the target word.

13. The electronic device of claim 12, wherein the electronic device is further configured to:

determine that the first candidate word does not respect the at least one pre-determined rule, the electronic device configured to determine comprising the electronic device configured to:

compare the first candidate word against a pre-determined vocabulary of words.

14. The electronic device of claim 12, wherein the electronic device being further configured to:

determine that the second candidate word does respect the at least one pre-determined rule, the electronic device configured to determine comprising the electronic device configured to:

compare the second candidate word against a pre-determined vocabulary of words.

15. The electronic device of claim 12, wherein the at least one last output token in the first sequence is at least two last output tokens in the first sequence.

16. The electronic device of claim 12, wherein the decoder portion includes an attention mechanism, and wherein the electronic device configured to generate the first sequence of output tokens comprises the electronic device configured to:

generate, by employing the decoder portion, a first output token in the first sequence based on the sequence of vector representations;

provide an indication of the first output token to the attention mechanism of the decoder portion; and generate, by employing the decoder portion, a second output token in the first sequence based on the sequence of vector representations and the indication of the first output token, the first output token being a previous output token to the second output token in the first sequence, the second output token being generated by the decoder portion while taking into account at least the previous output token.

17. The electronic device of claim 12, wherein the electronic device configured to trigger the decoder portion to generate the second sequence comprises the electronic device configured to:

trigger the decoder portion to return to a previous state, the previous state being a state of the decoder portion prior to generation of a first one of the at least one last output token from the first sequence; and generate, by employing the decoder portion in the previous state, a first one of the at least one last output token of the second sequence while prohibiting the first one of the at least one last output token of the second sequence to be identical to the first one of the at least one last output token of the first sequence.

18. The electronic device of claim 12, wherein the translation is performed by the electronic device without accessing a server.

19. The electronic device of claim 12, wherein in response to the second candidate word not respecting the at least one pre-determined rule, the electronic device is configured to:

trigger the decoder portion to generate an other second sequence of output tokens, the other second sequence having a different at least one last output token than (i) the at least one last output token of the first sequence and (ii) the at least one last output token of the second sequence, the other second sequence being representative of an other second candidate word;

in response to the other second candidate word respecting the at least one pre-determined rule:

determine that the other second candidate word is the target word.

20. The electronic device of claim 19, wherein the electronic device is further configured to:

trigger the decoder portion to generate a pre-determined number of second sequences of output tokens, the pre-determined number of second sequences including the second sequence and the other second sequence, the pre-determined number of second sequences being representative of a pre-determined number of second candidate words;

in response to none of the pre-determined number of second candidate words respecting the at least one pre-determined rule:

determine that the first candidate word is the target word.

\* \* \* \* \*